(12) United States Patent
Bai et al.

(10) Patent No.: US 11,533,219 B2
(45) Date of Patent: Dec. 20, 2022

(54) PRIORITIZING PROCEDURES FOR TRANSMISSION OF A BEAM FAILURE RECOVERY REQUEST VIA A SECONDARY CELL USED FOR CARRIER AGGREGATION

(71) Applicant: QUALCOMM Incorporated, San Diego, CA (US)

(72) Inventors: Tianyang Bai, Somerville, NJ (US); Tao Luo, San Diego, CA (US); Jung Ho Ryu, Fort Lee, NJ (US); Junyi Li, Chester, NJ (US); Kiran Venugopal, Raritan, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/020,064

(22) Filed: Sep. 14, 2020

(65) Prior Publication Data
US 2021/0092002 A1 Mar. 25, 2021

Related U.S. Application Data

(60) Provisional application No. 62/902,761, filed on Sep. 19, 2019.

(51) Int. Cl.
*H04L 12/26* (2006.01)
*H04L 41/0654* (2022.01)
(Continued)

(52) U.S. Cl.
CPC ......... *H04L 41/0654* (2013.01); *H04W 16/32* (2013.01); *H04W 24/08* (2013.01);
(Continued)

(58) Field of Classification Search
CPC .................................................. H04L 41/0654
See application file for complete search history.

(56) References Cited

U.S. PATENT DOCUMENTS 10,700,751 B2 * 6/2020 Park .................... H04L 5/0057
11,095,355 B2 * 8/2021 Cirik ................... H04L 1/1832
(Continued)

FOREIGN PATENT DOCUMENTS

CN 111918324 A * 11/2020
WO 2019027294 A1 2/2019
(Continued)

OTHER PUBLICATIONS

International Search Report and Written Opinion—PCT/US2020/050866—ISA/EPO—dated Nov. 24, 2020.

*Primary Examiner* — Guang W Li
(74) *Attorney, Agent, or Firm* — Harrity & Harrity, LLP

(57) ABSTRACT

Various aspects of the present disclosure generally relate to wireless communication. In some aspects, a user equipment (UE) may detect beam failure on a secondary cell (SCell), wherein the UE is configured with a primary cell (PCell) and the SCell for carrier aggregation with a base station; identify an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the UE, or a combination thereof; and transmit the beam failure recovery request to the base station using a first procedure, of the multiple procedures, based at least in part on the order. Numerous other aspects are provided.

30 Claims, 6 Drawing Sheets

(51) Int. Cl.
  *H04W 74/08*    (2009.01)
  *H04W 24/08*    (2009.01)
  *H04W 72/04*    (2009.01)
  *H04W 72/10*    (2009.01)
  *H04W 16/32*    (2009.01)

(52) U.S. Cl.
  CPC ....... *H04W 72/0413* (2013.01); *H04W 72/10* (2013.01); *H04W 74/0833* (2013.01)

(56) References Cited

U.S. PATENT DOCUMENTS

| | | | |
|---|---|---|---|
| 11,202,315 B2* | 12/2021 | Rastegardoost | H04W 72/042 |
| 2018/0007574 A1* | 1/2018 | Park | H04B 7/04 |
| 2019/0053294 A1* | 2/2019 | Xia | H04W 74/0833 |
| 2019/0166539 A1* | 5/2019 | Chen | H04W 36/0088 |
| 2019/0215888 A1* | 7/2019 | Cirik | H04B 7/0695 |
| 2019/0274098 A1* | 9/2019 | Cheng | H04W 76/19 |
| 2020/0137821 A1* | 4/2020 | Cirik | H04B 7/063 |
| 2020/0413273 A1* | 12/2020 | Turtinen | H04B 7/0695 |
| 2021/0194566 A1* | 6/2021 | Shi | H04B 7/0626 |
| 2021/0392692 A1* | 12/2021 | Sakhnini | H04W 74/0833 |
| 2021/0409091 A1* | 12/2021 | Svedman | H04L 5/0051 |
| 2022/0140884 A1* | 5/2022 | Shi | H04W 24/10 370/329 |
| 2022/0182281 A1* | 6/2022 | Cirik | H04W 24/10 |

FOREIGN PATENT DOCUMENTS

| | | |
|---|---|---|
| WO | 2019032882 A1 | 2/2019 |
| WO | WO-2021056336 A1 * | 4/2021 |

* cited by examiner

PRIORITIZING PROCEDURES FOR TRANSMISSION OF A BEAM FAILURE RECOVERY REQUEST VIA A SECONDARY CELL USED FOR CARRIER AGGREGATION

CROSS-REFERENCE TO RELATED APPLICATION

This patent application claims priority to U.S. Patent Application No. 62/902,761, filed on Sep. 19, 2019, entitled "PRIORITIZING PROCEDURES FOR TRANSMISSION OF A BEAM FAILURE RECOVERY REQUEST VIA A SECONDARY CELL USED FOR CARRIER AGGREGATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for prioritizing procedures for transmission of a beam failure recovery request via a secondary cell used for carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting beam failure on a secondary cell (SCell), wherein the UE is configured with a primary cell (PCell) and the SCell for carrier aggregation with a base station; identifying an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the UE, or a combination thereof; and transmitting the beam failure recovery request to the base station using a first procedure, of the multiple procedures, based at least in part on the order.

In some aspects, a UE for wireless communication may include memory and one or more processors operatively coupled to the memory. The memory and the one or more processors may be configured to detect beam failure on an SCell, wherein the UE is configured with a PCell and the SCell for carrier aggregation with a base station; identify an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the UE, or a combination thereof; and transmit the beam failure recovery request to the base station using a first procedure, of the multiple procedures, based at least in part on the order.

In some aspects, a non-transitory computer-readable medium may store one or more instructions for wireless communication. The one or more instructions, when executed by one or more processors of a UE, may cause the one or more processors to: detect beam failure on an SCell, wherein the UE is configured with a PCell and the SCell for carrier aggregation with a base station; identify an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the UE, or a combination thereof; and transmit the beam failure recovery request to the base station using a first procedure, of the multiple procedures, based at least in part on the order.

In some aspects, an apparatus for wireless communication may include means for detecting beam failure on an SCell, wherein the apparatus is configured with a PCell and the SCell for carrier aggregation with a base station; means for identifying an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the apparatus, or a combination thereof; and means for transmitting the beam failure recovery request to the base station using a first procedure, of the multiple procedures, based at least in part on the order.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
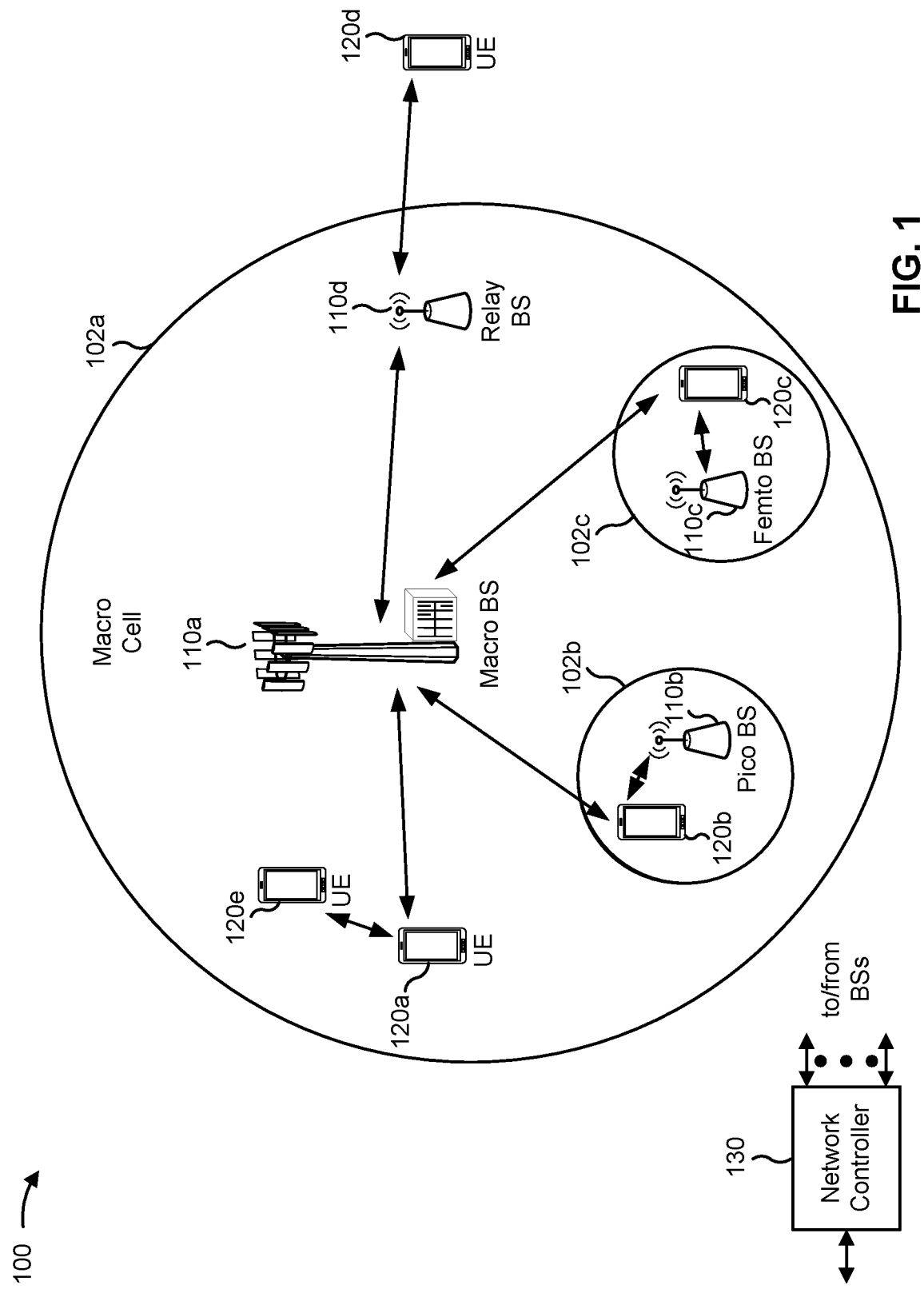
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
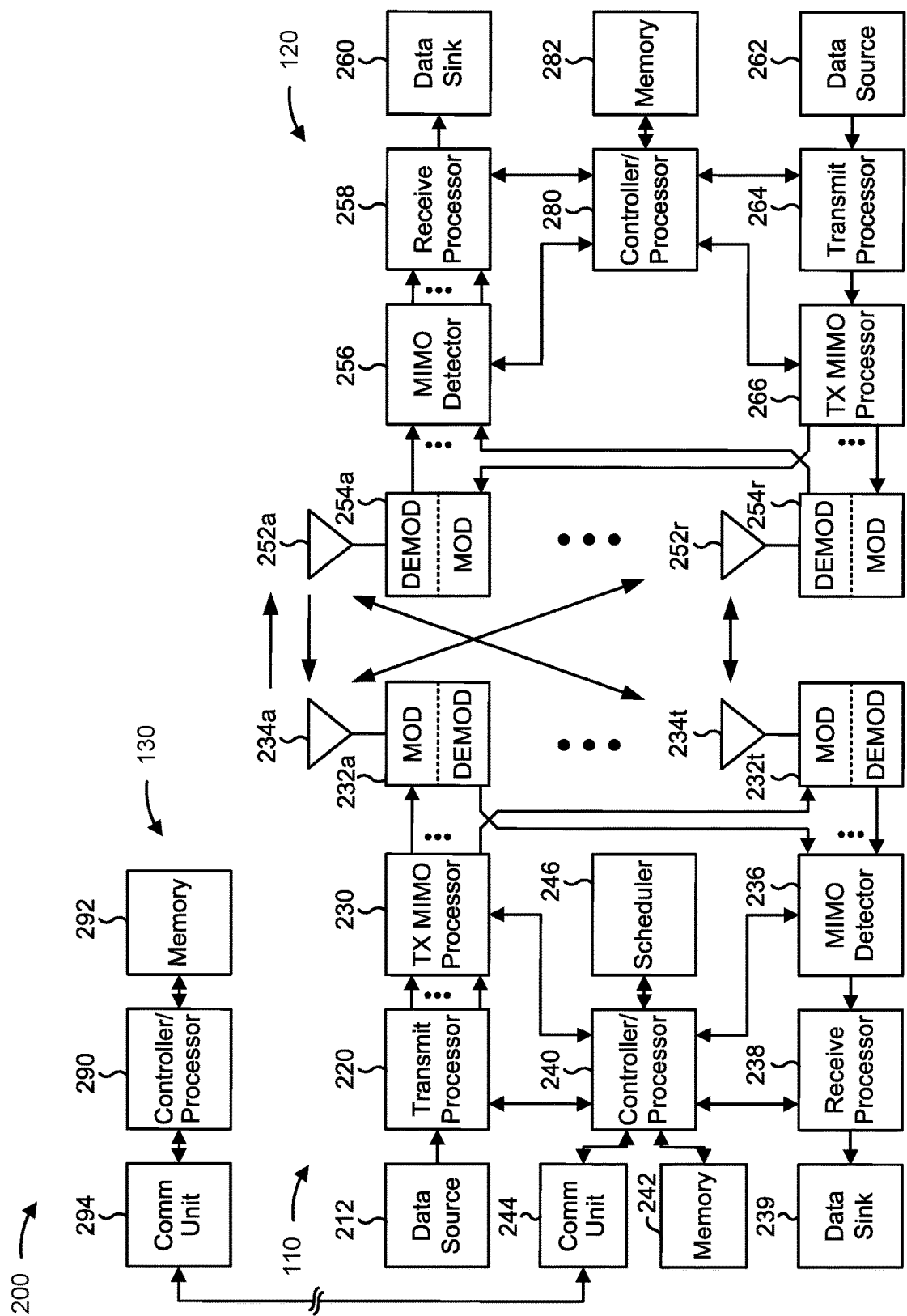
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with prioritizing procedures for transmission of a beam failure recovery request via a secondary cell used for carrier aggregation, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for detecting beam failure on an SCell, wherein the UE 120 is configured with a PCell and the SCell for carrier aggregation with a base station; means for identifying an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the UE 120, or a combination thereof; means for transmitting the beam failure recovery request to the base station using a first procedure, of the multiple procedures, based at least in part on the order; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
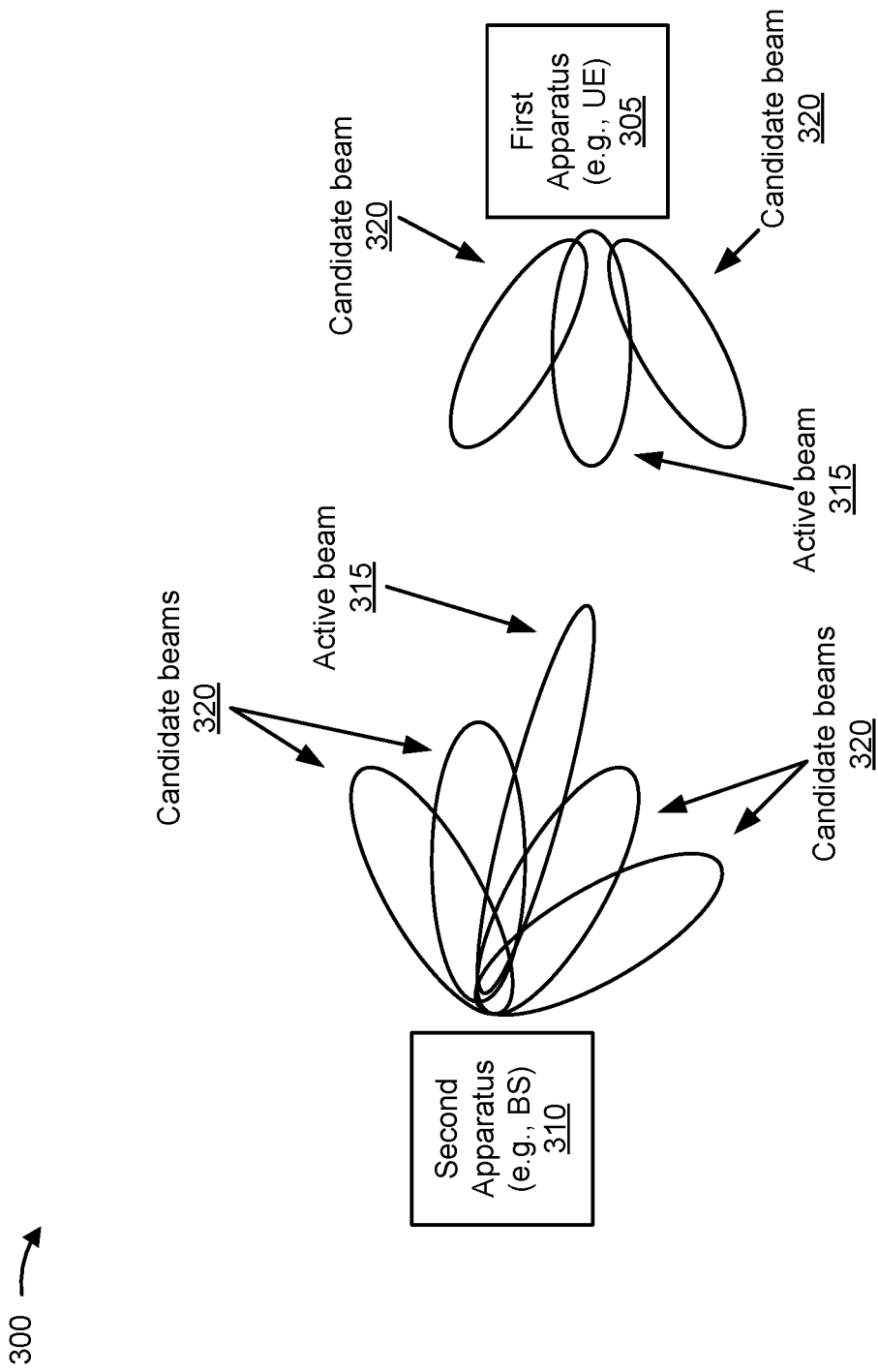
FIG. 3 is a diagram illustrating an example of wireless communication via one or more beams, in accordance with certain aspects of the present disclosure.

FIG. 3 is a diagram illustrating an example 300 of wireless communication via one or more beams, in accordance with certain aspects of the present disclosure.

As shown in FIG. 3, a first apparatus 305 (e.g., shown as a UE in example 300) may communicate with a second apparatus 310 (e.g., shown as a base station in example 300) using one or more active beams 315. In some aspects, the first apparatus 305 and the second apparatus 310 may also be capable of communicating via one or more candidate beams 320. In some aspects, an active beam 315 may be selected from a set of candidate beams 320 by comparing beam parameters (e.g., RSRP, RSRQ, RSSI, and/or the like) of the set of candidate beams 320. For example, an active beam 315 may be the beam that has the best beam parameters among all beams in the set of candidate beams 320. In some aspects, the beams may operate in a millimeter wave radio frequency band.

In some aspects, if the active beam 315 experiences a failure, the first apparatus 305 may perform a beam failure recovery procedure. For example, upon detecting the failure of the active beam 315, the first apparatus 305 may attempt to communicate with the second apparatus 310 by transmitting a beam failure recovery request (BFRQ) via one or more candidate beams 320. However, this procedure increases in complexity if the first apparatus 305 and the second apparatus 310 are communicating using carrier aggregation, where there are multiple possible cells (e.g., a primary cell and one or more secondary cells, which may be included in one or more secondary cell groups) via which a BFRQ could be transmitted. Some techniques and apparatuses described herein assist with transmission of a beam failure recovery request via a secondary cell used for carrier aggregation.

As indicated above, FIG. 3 is provided as an example. Other examples may differ from what is described with regard to FIG. 3.

Figure 4:
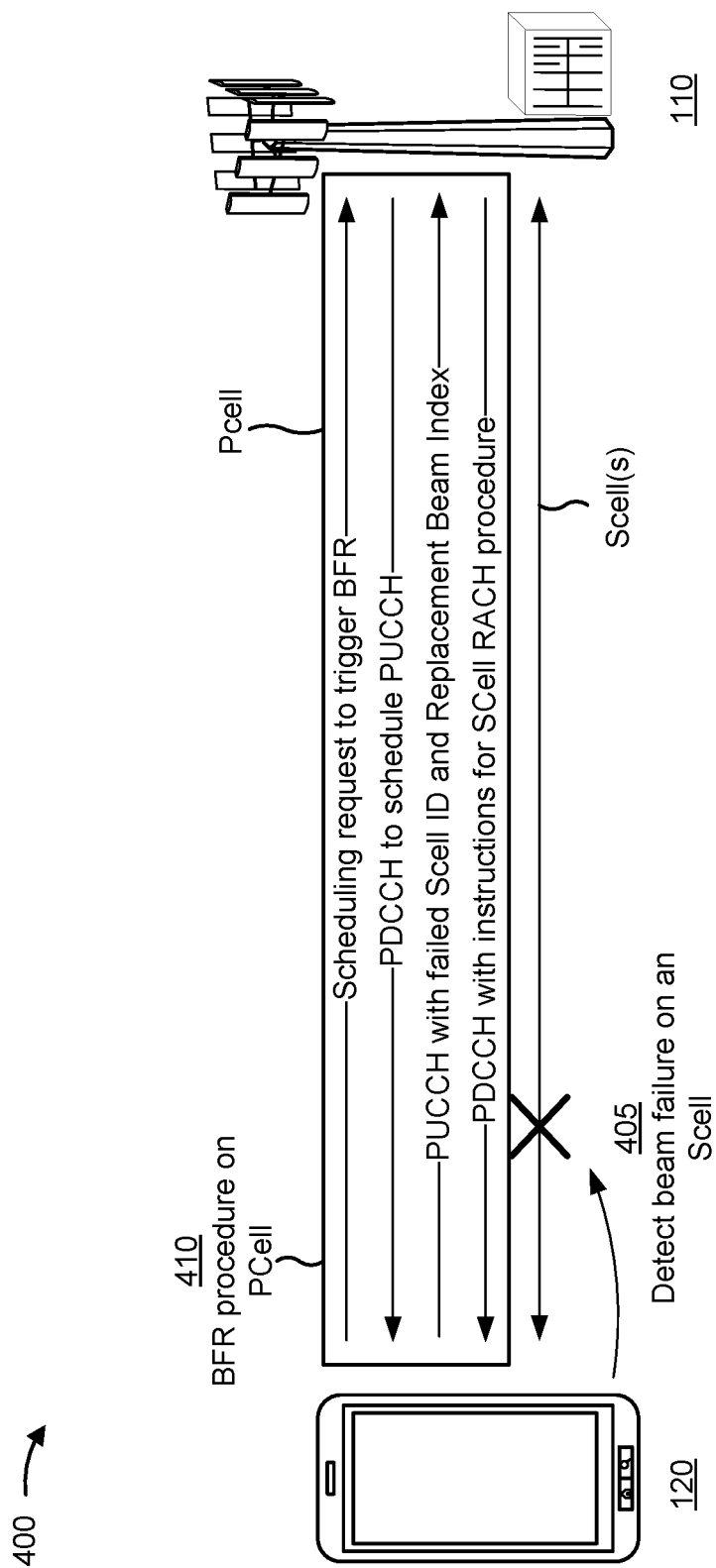
FIG. 4 is a diagram illustrating an example of a beam failure recovery procedure, in accordance with certain aspects of the present disclosure.

FIG. 4 is a diagram illustrating an example 400 of a beam failure recovery procedure, in accordance with certain aspects of the present disclosure.

As shown in FIG. 4, a base station 110 and a UE 120 may communicate with one another using carrier aggregation. Using carrier aggregation, the base station 110 and the UE 120 may communicate with one another using a primary cell (PCell) and one or more secondary cells (SCells). In example 400, the SCells are DL-only SCells, meaning that the SCells are configured for only downlink communications, and are not configured for uplink communications.

As shown by reference number 405, the UE 120 may detect beam failure on a DL-only SCell. As shown by reference number 410, the UE 120 and the base station 110 may perform a beam failure recovery procedure using the PCell. For example, the UE 120 may transmit a scheduling request on the PCell via a physical uplink control channel (PUCCH). The scheduling request may trigger beam failure recovery (BFR). Based at least in part on receiving the scheduling request, the base station 110 may transmit, on the PCell, a physical downlink shared channel (PDCCH) communication that schedules a PUCCH communication for BFR.

The UE 120 may receive the PDCCH communication, and may transmit the scheduled PUCCH communication on the PCell. The PUCCH communication may identify the SCell that experienced the beam failure and/or may indicate a candidate beam index for a candidate beam to replace the failed beam. For example, the PUCCH communication may include a medium access control (MAC) control element (CE) (collectively, MAC-CE) that identifies the failed SCell and the replacement beam. Based at least in part on receiving the PUCCH communication, the base station 110 may transmit, on the PCell, a PDCCH communication that instructs the UE 120 regarding the BFR procedure. For example, the PDCCH communication may instruct the UE 120 to perform a random access procedure for the SCell on one or more candidate beams. The UE 120 may perform BFR according to the PDCCH communication to obtain a new beam for communications on the SCell.

In some cases, one or more SCells used for carrier aggregation between the UE 120 and the base station 110 may be configured for uplink communications. In such cases, a beam failure recovery procedure for an SCell may be performed that includes the UE 120 transmitting one or more uplink messages via the SCell or another SCell configured for the UE 120. In this way, a load on the PCell may be reduced. Furthermore, reliability may be increased by increasing transmit diversity of uplink BFR messages, such as by using multiple SCells, the PCell and one or more SCells, and/or the like. However, there may be multiple options regarding which SCell (or SCells) to use for transmission of a BFRQ, which resources of the SCell (or SCells) to use for transmission of a BFRQ, whether to use the PCell in addition to one or more SCells to transmit a BFRQ, and/or the like. Some techniques and apparatuses described herein permit prioritization of one or more procedures for transmission of a BFRQ (e.g., according to an order), such as one or more procedures on the PCell, on one or more SCells, and/or the like. In some cases, the prioritization (e.g., the order) may reduce ambiguity between the UE 120 and the base station 110, may improve reliability, may reduce latency, may provide transmit diversity, may balance a load across carriers, and/or the like.

As indicated above, FIG. 4 is provided as an example. Other examples may differ from what is described with regard to FIG. 4.

Figure 5:
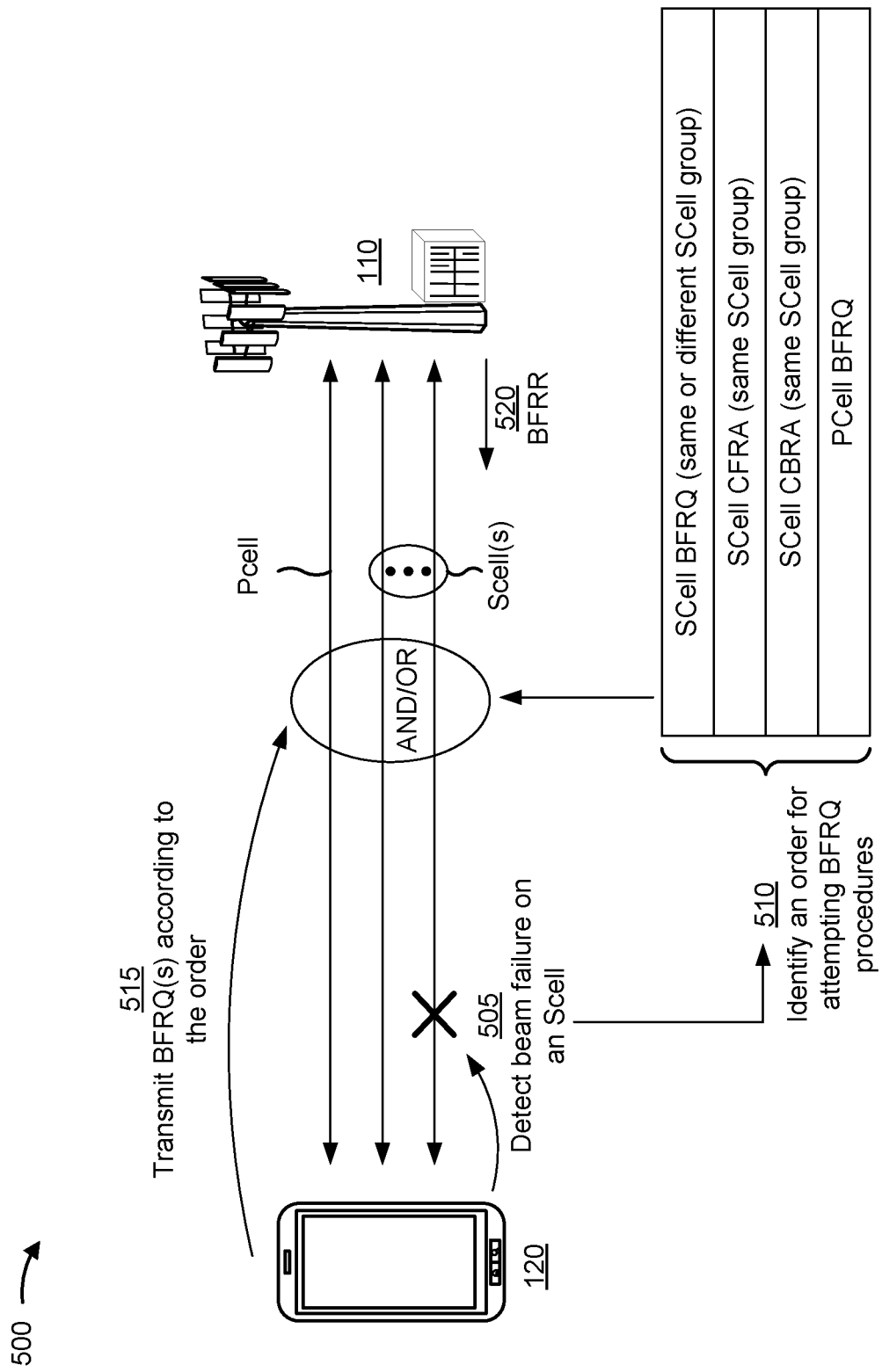
FIG. 5 is a diagram illustrating an example of prioritizing procedures for transmission of a beam failure recovery request via a secondary cell used for carrier aggregation, in accordance with various aspects of the present disclosure.

FIG. 5 is a diagram illustrating an example 500 of prioritizing procedures for transmission of a beam failure recovery request via a secondary cell used for carrier aggregation, in accordance with various aspects of the present disclosure.

As shown in FIG. 5, a UE 120 and a base station 110 may communicate with one another using carrier aggregation. Using carrier aggregation, the UE 120 and the base station 110 may communicate with one another using a PCell and one or more SCells. In example 500, one or more of the SCells may be configured for uplink communications. In some aspects, one or more of the SCells may be configured for both uplink communications and downlink communications. In some aspects, the base station 110 may configure the PCell and the one or more SCells for the UE 120, such as by using a configuration indicated in a radio resource control (RRC) message (e.g., an RRC configuration message, an RRC reconfiguration message, and/or the like).

As shown by reference number 505, the UE 120 may detect a beam failure on an SCell (e.g., an SCell configured for the UE 120). In some aspects, the beam failure may be a full failure of all channels (e.g., control channels, data channels, and/or the like) associated with the UE 120 and/or the SCell. In some aspects, the beam failure is a partial failure of the channels (e.g., a failure of one or more channels, a failure of a subset of channels, and/or the like) associated with the UE 120 and/or the SCell.

As shown by reference number 510, the UE 120 may identify an order in which multiple procedures for transmitting a beam failure recovery request (BFRQ) are to be attempted. The order may indicate a procedure to be performed first, a procedure to be performed second, and so on. Additionally, or alternatively, the order may indicate a dependency of procedures, such as a procedure that must be performed before another procedure. In some aspects, the multiple procedures may include one or more of a procedure for transmitting the BFRQ via the PCell or a procedure for transmitting the BFRQ via one or more SCells configured for the UE 120. For example, the multiple procedures may include a procedure for transmitting the BFRQ via the PCell and a procedure for transmitting the BFRQ via an SCell. Additionally, or alternatively, the multiple procedures may include a procedure for transmitting the BFRQ via a first SCell and a procedure for transmitting the BFRQ via a second SCell.

As shown in FIG. 5, the multiple procedures may include two or more of a variety of procedures that use the PCell and/or one or more SCells. For example, a procedure, of the multiple procedures, may include a procedure for transmitting the BFRQ via the one or more SCells, which may include a procedure for transmitting the BFRQ using a PUCCH resource group configured for BFRQ on the one or more SCells, a contention-free random access (CFRA) procedure for transmitting the BFRQ via the one or more SCells, a contention-based random access (CBRA) procedure for transmitting the BFRQ via the one or more SCells, and/or the like.

In some aspects, the UE 120 may be configured with one or more SCell groups that each include a set of SCells. For example, an SCell group may include multiple SCells included in the same frequency band (e.g., different sub-bands of the same frequency band). As another example, an SCell group may include multiple SCells with beams that are quasi co-located with one another (e.g., the beams of the SCells in the SCell group have the same quasi co-location (QCL) relationship). In some aspects, the one or more SCells used by the UE 120 to transmit the BFRQ may include one or more SCells in a different SCell group than the SCell for which the beam failure is detected. In this way, the UE 120 may improve reliability as compared to transmitting the BFRQ on the SCell that experiences a beam failure. Additionally, or alternatively, the one or more SCells used by the UE 120 to transmit the BFRQ may include one or more SCells in the same SCell group as the SCell for which the beam failure is detected. This may reduce complexity as compared to using a different SCell group. In some aspects, the UE 120 may attempt to transmit the BFRQ via the SCell that experienced the beam failure (e.g., the failed SCell). Additionally, or alternatively, the UE 120 may attempt to transmit the BFRQ via an SCell other than the failed SCell (e.g., a non-failed SCell).

Thus, a procedure, of the multiple procedures, may include a procedure for transmitting the BFRQ via the failed SCell using a PUCCH resource group configured for the BFRQ for the failed SCell, a procedure for transmitting the BFRQ via a non-failed SCell in a same SCell group as the failed SCell using a PUCCH resource group configured for the BFRQ for the non-failed SCell in the same SCell group as the failed SCell, a procedure for transmitting the BFRQ via a non-failed SCell in a different SCell group than the failed SCell using a PUCCH group configured for the BFRQ for the non-failed SCell in the different SCell group than the failed SCell, a CFRA procedure for transmitting the BFRQ via the failed SCell, a CFRA procedure for transmitting the BFRQ via a non-failed SCell in a same SCell group as the failed SCell, a CBRA procedure for transmitting the BFRQ via the failed SCell, a CBRA procedure for transmitting the BFRQ via a non-failed SCell in a same SCell group as the failed SCell, and/or the like.

In some aspects, the UE 120 may determine the order based at least in part on a prespecified rule (e.g., a rule specified by a wireless communication standard). Additionally, or alternatively, the UE 120 may determine the order based at least in part on a rule indicated by the base station 110, such as in an RRC message, a MAC-CE, and/or the like. The rule may indicate a sequence for performing multiple procedures, a dependency for multiple procedures (e.g., Procedure A is to be performed before Procedure B), and/or the like.

Additionally, or alternatively, the UE 120 may determine the order based at least in part on a set of channel measurements performed by the UE 120. For example, the UE 120 may perform the set of channel measurements on the PCell, on one or more SCells, and/or the like. In this case, the UE 120 may set the order such that a procedure is performed on a first cell (e.g., an SCell or the PCell) associated with better channel measurements before a procedure is performed on a second cell (e.g., an SCell of the PCell) associated with worse channel measurements. For example, the UE 120 may compare channel measurements for a set of SCells, such as a set of SCells that support uplink communications, a set of SCells for which a PUCCH group for BFRQ resources is configured, a set of SCells for which CFRA resources is configured, a set of SCells for which CBRA resources is configured, and/or the like. Based at least in part on the comparison, the UE 120 may prioritize an SCell, in the set of SCells, over another SCell, in the set of SCells, for transmission of the BFRQ. In some aspects, if none of the SCells in the set of SCells are associated with a channel measurement that satisfies a condition (e.g., if none of the SCells are associated with an RSRP parameter that satisfies a threshold), then the UE 120 may prioritize the PCell for transmission of the BFRQ. "Prioritizing a cell" may refer to prioritizing a cell within the order for the multiple procedures such that a procedure is performed using that cell earlier in time (e.g., earliest in time) as compared to another procedure on another cell.

In some aspects, one or more SCells of the UE 120 may be configured with a PUCCH resource group for BFRQ. For example, the base station 110 may configure the UE 120 with a set of uplink resources (e.g., a PUCCH resource group) to be used for transmission of a BFRQ. This set of (one or more) uplink resources may be referred to herein as a set of BFRQ resources. In some aspects, the base station 110 may configure the UE 120 with a set of BFRQ resources in an RRC message. The configuration for the BFRQ resources may indicate, for example, a periodicity for the set of BFRQ resources, an offset for the set of BFRQ resources, and/or the like. In some aspects, the base station 110 may configure the UE 120 with a set of BFRQ resources for a particular SCell (e.g., a per-SCell BFRQ resource configuration). In this case, some SCells may be configured with BFRQ resources, and some SCells may not be configured with BFRQ resources. Furthermore, different SCells may be configured with different BFRQ resources. In some aspects, the UE 120 may determine the order for the multiple procedures based at least in part on a BFRQ resource configuration. For example, the UE 120 may determine the order based at least in part on an order in which a set of BFRQ resources, configured for SCells of the UE 120, occur. For example, the UE 120 may prioritize a cell (e.g., the PCell or one or more SCells) configured with a BFRQ resource that occurs earlier in time or earliest in time (e.g., after detection of the beam failure). In this way, latency may be reduced.

As shown by reference number 515, the UE 120 may transmit one or more BFRQs to the base station 110 based at least in part on the identified order. For example, the order may indicate a procedure to be performed first, a procedure to be performed second, etc. The UE 120 may attempt to transmit a BFRQ using the procedure to be performed first. If the transmission attempt fails, then the UE 120 may attempt to transmit a BFRQ using the procedure to be performed second, and so on. For example, the UE 120 may attempt to transmit the BFRQ using a procedure to be performed later (e.g., second) based at least in part on a determination that a procedure to be performed earlier (e.g., first) has failed a threshold number of times. Additionally, or alternatively, the UE 120 may attempt to transmit the BFRQ using a procedure to be performed later (e.g., second) based at least in part on a determination that a timer, associated with a procedure to be performed earlier (e.g., first), has expired. In some aspects, a timer may be initiated upon attempting to perform a BFRQ transmission procedure.

In some aspects, the UE 120 may refrain from transmitting the BFRQ to the base station using a procedure, of the multiple procedures, based at least in part on a determination that a condition associated with the procedure is satisfied. For example, if the procedure uses BFRQ resources to transmit the BFRQ (e.g., PUCCH resources and/or PUCCH-BFRQ resources), and there are not any BFRQ resources (e.g., PUCCH resources and/or PUCCH-BFRQ resources) configured for a particular set of SCells (e.g., if none of the SCells configured for the UE 120 are configured with a PUCCH resource and/or a PUCCH-BFRQ resource), then the UE 120 may refrain from performing that procedure on the particular set of SCells (e.g., may not transmit a BFRQ on any SCell if none of the SCells are configured with a PUCCH resource and/or a PUCCH-BFRQ resource). In this case, the UE 120 may transmit the BFRQ via a PCell (e.g., on a PUCCH-BFRQ resource configured on the PCell). Similarly, if the PCell is not configured with a BFRQ resource, then the UE 120 may transmit the BFRQ via an SCell (e.g., an SCell configured with BFRQ resources). In some aspects, if both an SCell and the PCell are configured with a BFRQ resource, the UE 120 may transmit the BFRQ on either the SCell, the PCell, or both, according to a priority rule (e.g., stored in memory of the UE 120 and/or configured by the base station 110).

Additionally, or alternatively, if the procedure uses CFRA resources to transmit the BFRQ, and there are not any CFRA resources configured for a particular set of SCells, then the UE 120 may refrain from performing that procedure on the particular set of SCells. Additionally, or alternatively, if a particular set of SCells is not configured for uplink communications, then the UE 120 may refrain from performing any procedures for transmitting BFRQ on the particular set of SCells (e.g., may refrain from performing a procedure using BFRQ resources, may refrain from performing a procedure using CFRA resources, and may refrain from performing a procedure using CBRA resources).

As used herein, "a procedure that uses BFRQ resources for BFRQ" may refer to a procedure that uses a PUCCH group configured for BFRQ (e.g., a PUCCH-BFRQ). A procedure that uses CFRA resources for BFRQ may be referred to as a CFRA procedure. In a CFRA procedure, the UE 120 is configured with time domain resources, frequency domain resources, and a UE-specific sequence for CFRA. In the CFRA procedure, the UE 120 performs a random access channel (RACH) procedure by transmitting the sequence in the time domain resources and the frequency domain resources (e.g., on one or more beams). The base station 110 may receive the UE-specific sequence, and may instruct the UE 120 regarding a candidate beam to replace the failed beam. In a CBRA procedure, the UE 120 is configured with time domain resources, frequency domain resources, and a pool of sequences for CBRA. In the CBRA procedure, the UE 120 performs a RACH procedure by selecting a sequence from the pool and transmitting the selected sequence in the time domain resources and the frequency domain resources (e.g., on one or more beams). The base station 110 may receive the sequence, and may instruct the UE 120 regarding a candidate beam to replace the failed beam. A procedure that uses BFRQ resources, a procedure that uses CFRA resources, and a procedure that uses CBRA procedures are all examples of types of BFRQ procedures.

As shown by reference number 520, based at least in part on receiving the BFRQ, the base station 110 may transmit a beam failure recovery response (BFRR) to the UE 120. In some aspects, the BFRR is transmitted on the PCell. In some aspects, the BFRR is transmitted on one or more of the SCells used by the UE 120 to transmit the BFRQ. For example, the BFRR may be transmitted on the same SCell used by the UE 120 to transmit the BFRQ. In some aspects, the BFRR may be transmitted on multiple SCells (e.g., if the UE 120 uses multiple SCells to transmit the BFRQ). In some aspects, the BFRQ may indicate an SCell that experienced a beam failure (e.g., using an SCell identifier), a candidate beam to replace the failed beam, and/or the like.

In some aspects, the BFRR includes an acknowledgement (ACK), such as an ACK to a MAC-CE transmitted by the UE 120 in a physical uplink shared channel (PUSCH) of a two-step BFRQ procedure. In the two-step BFRQ procedure, the UE 120 may transmit a MAC-CE that indicates a candidate beam. In this case, the BFRR may be an ACK to the MAC-CE, and may indicate that the base station 110 approves or acknowledges the indicated candidate beam for subsequent communications on the failed SCell. Alternatively, the base station 110 may indicate a different beam for the failed SCell than the beam indicated by the UE 120. The two-step BFRQ procedure may be a procedure where the UE 120 uses configured BFRQ resources to perform beam failure recovery.

In some aspects, the BFRR includes a PDCCH communication, such as a PDCCH order for a CFRA procedure or a CBRA procedure that is part of a one-step BFRQ procedure. In the one-step BFRQ procedure, the UE 120 notifies the base station 110 of beam failure, and the base station 110 uses the PDCCH communication to instruct the UE 120 to perform a CFRA procedure or a CBRA procedure to identify a candidate beam to replace the failed beam of the SCell. The one-step BFRQ procedure may be a procedure where the UE 120 uses configured CFRA resources or configured CBRA resources to perform beam failure recovery.

By using one or more SCells to transmit a BFRQ, the UE 120 may reduce a load on the PCell, may reduce ambiguity between the UE 120 and the base station 110 (e.g., by following a rule or identifying SCells in a manner common to both the UE 120 and the base station 110), may improve reliability, may reduce latency, may provide transmit diversity, may balance a load across cells or carriers, and/or the like. Furthermore, by identifying an order in which one or more procedures for BFRQ are to be attempted, the UE 120 may reduce a load on the PCell (e.g., by attempting BFRQ on one or more SCells before attempting BFRQ on the PCell), may reduce ambiguity between the UE 120 and the base station 110 (e.g., by following an order that is known by both the UE 120 and the base station 110), may improve reliability (e.g., by prioritizing cells with better channel measurements), may reduce latency (e.g., by prioritizing cells with earlier-occurring BFRQ resources), may provide transmit diversity (e.g., by transmitting on multiple cells), may balance a load across cells or carriers, and/or the like.

As indicated above, FIG. 5 is provided as an example. Other examples may differ from what is described with regard to FIG. 5.

Figure 6:
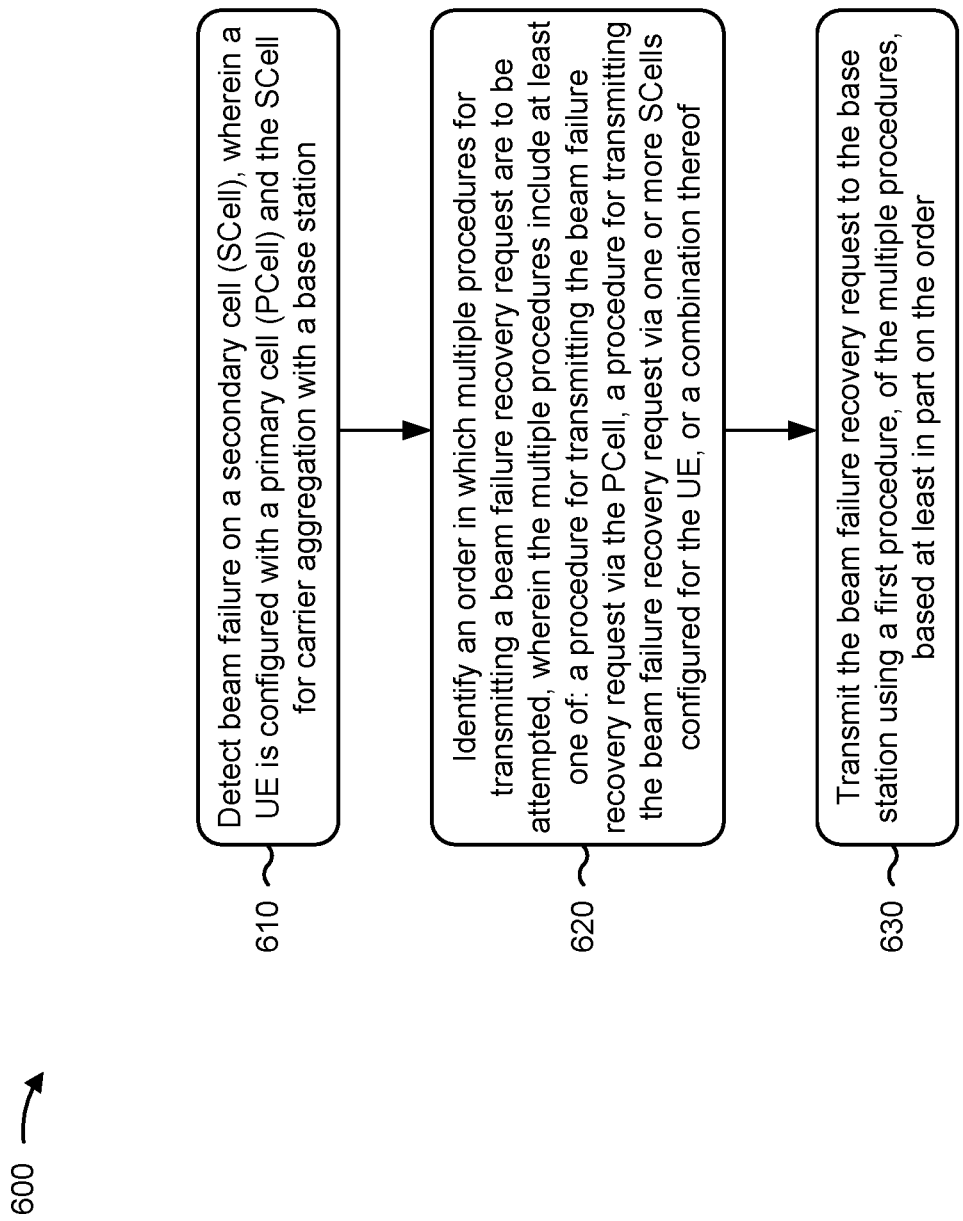
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with prioritizing procedures for transmission of a beam failure recovery request via a secondary cell used for carrier aggregation.

As shown in FIG. 6, in some aspects, process 600 may include detecting beam failure on an SCell, wherein the UE is configured with a PCell and the SCell for carrier aggregation with a base station (block 610). For example, the UE (e.g., using receive processor 258, transmit processor 264, controller/processor 280, memory 282, and/or the like) may detect beam failure on an SCell, as described above. In some aspects, the UE is configured with a PCell and the SCell for carrier aggregation with a base station.

As further shown in FIG. 6, in some aspects, process 600 may include identifying an order in which multiple procedures for transmitting a beam failure recovery request are to be attempted, wherein the multiple procedures include at least one of: a procedure for transmitting the beam failure recovery request via the PCell, a procedure for transmitting the beam failure recovery request via one or more SCells configured for the UE, or a combination thereof (block 620). For example, the UE (e.g., using receive processor 258, transmit processor 264, controller/processor 280, memory 282, and/or the like) may identify an order in which multiple procedures for transmitting a beam failure recovery request are to be attempted, as described above. In some aspects, the multiple procedures include at least one of: a procedure for transmitting the beam failure recovery request via the PCell, a procedure for transmitting the beam failure recovery request via one or more SCells configured for the UE, or a combination thereof.

As further shown in FIG. 6, in some aspects, process 600 may include transmitting the beam failure recovery request to the base station using a first procedure, of the multiple procedures, based at least in part on the order (block 630). For example, the UE (e.g., using transmit processor 264, controller/processor 280, memory 282, and/or the like) may transmit the beam failure recovery request to the base station using a first procedure, of the multiple procedures, based at least in part on the order, as described above.

Process 600 may include additional aspects, such as any single aspect or any combination of aspects described below and/or in connection with one or more other processes described elsewhere herein.

In a first aspect, the multiple procedures further include at least one of: a procedure for transmitting the beam failure recovery request via the one or more SCells using a physical uplink control channel resource group configured for the beam failure recovery request, a contention-free random access procedure for transmitting the beam failure recovery request via the one or more SCells, a contention-based random access procedure for transmitting the beam failure recovery request via the one or more SCells, or a combination thereof.

In a second aspect, alone or in combination with the first aspect, the multiple procedures further include at least one of: a procedure for transmitting the beam failure recovery request via the SCell using a physical uplink control channel resource group configured for the beam failure recovery request for the SCell, a procedure for transmitting the beam failure recovery request via another SCell in a same SCell group as the SCell using a physical uplink control channel resource group configured for the beam failure recovery request for the other SCell in the same SCell group as the SCell, a procedure for transmitting the beam failure recovery request via another SCell in a different SCell group than the SCell using a physical uplink control channel resource group configured for the beam failure recovery request for the other SCell in the different SCell group than the SCell, a contention-free random access procedure for transmitting the beam failure recovery request via the SCell, a contention-free random access procedure for transmitting the beam failure recovery request via another SCell in a same SCell group as the SCell, a contention-based random access procedure for transmitting the beam failure recovery request via the SCell, a contention-based random access procedure for transmitting the beam failure recovery request via another SCell in a same SCell group as the SCell, or a combination thereof.

In a third aspect, alone or in combination with one or more of the first and second aspects, the one or more SCells are in a different SCell group than the SCell for which the beam failure is detected.

In a fourth aspect, alone or in combination with one or more of the first through third aspects, the one or more SCells are in a same SCell group as the SCell for which the beam failure is detected.

In a fifth aspect, alone or in combination with one or more of the first through fourth aspects, the order is determined based at least in part on a prespecified rule or a rule indicated by the base station.

In a sixth aspect, alone or in combination with one or more of the first through fifth aspects, the order is determined based at least in part on a set of channel measurements performed by the UE on at least one of the PCell, the one or more SCells, or a combination thereof.

In a seventh aspect, alone or in combination with one or more of the first through sixth aspects, the order prioritizes an SCell, of the one or more SCells, for transmission of the beam failure recovery request based at least in part on the set of channel measurements.

In an eighth aspect, alone or in combination with one or more of the first through seventh aspects, the order prioritizes the PCell for transmission of the beam failure recovery request based at least in part on a determination that one or more channel measurements for the one or more SCells fail to satisfy a condition.

In a ninth aspect, alone or in combination with one or more of the first through eighth aspects, the order is determined based at least in part on an order in which a set of beam failure recovery request resources, configured for the UE, occur.

In a tenth aspect, alone or in combination with one or more of the first through ninth aspects, the order prioritizes a cell, of the PCell or the one or more SCells, configured with a beam failure recovery request resource that occurs earliest in time after detection of the beam failure.

In an eleventh aspect, alone or in combination with one or more of the first through tenth aspects, process 600 includes transmitting the beam failure recovery request to the base station using a second procedure, of the multiple procedures, based at least in part on the order and a determination that at least one of: the first procedure has failed a threshold number of times, a timer, associated with transmitting the beam failure recovery request using the first procedure, has expired, or a combination thereof.

In a twelfth aspect, alone or in combination with one or more of the first through eleventh aspects, process 600 includes refraining from transmitting the beam failure recovery request to the base station using a procedure, of the multiple procedures, based at least in part on a determination that a condition associated with the procedure is satisfied.

In a thirteenth aspect, alone or in combination with one or more of the first through twelfth aspects, the procedure is a contention-free random access procedure and the condition is that the one or more SCells are not configured with one or more contention-free random access resources.

In a fourteenth aspect, alone or in combination with one or more of the first through thirteenth aspects, the condition is that the one or more SCells are not configured for uplink communications.

In a fifteenth aspect, alone or in combination with one or more of the first through fourteenth aspects, the procedure is a procedure for transmitting the beam failure recovery request using a physical uplink control channel (PUCCH) resource group configured for the beam failure recovery request, and the condition is that the one or more SCells are not configured with a PUCCH resource group for the beam failure recovery request.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting beam failure on a secondary cell (SCell), wherein the UE is configured with a primary cell (PCell) and the SCell for carrier aggregation;
   transmitting a beam failure recovery request a first time using a procedure for transmitting the beam failure recovery request via the PCell or via one or more SCells configured for the UE; and
   transmitting the beam failure recovery request a second time using a random access channel (RACH) procedure after transmitting the beam failure recovery request the first time using the procedure for transmitting the beam failure recovery request via the PCell or via the one or more SCells, wherein the beam failure recovery request is transmitted using the RACH procedure based at least in part on the procedure for transmitting the beam failure recovery request via the PCell or via the one or more SCells failing a threshold number of times.

2. The method of claim 1, further comprising refraining from transmitting the beam failure recovery request using a different procedure based at least in part on a condition associated with the different procedure being satisfied.

3. The method of claim 2, wherein the different procedure is a procedure for transmitting the beam failure recovery request using a physical uplink control channel (PUCCH) resource group configured for the beam failure recovery request on the one or more SCells, and the condition is that the one or more SCells are not configured with a PUCCH resource group for the beam failure recovery request.

4. The method of claim 2, wherein the different procedure is a contention-free random access procedure and the condition is that the one or more SCells are not configured with one or more contention-free random access resources.

5. The method of claim 2, wherein the condition is that the one or more SCells are not configured for uplink communications.

6. The method of claim 1, wherein the procedure for transmitting the beam failure recovery request via the PCell or via the one or more SCells includes at least one of:
   a procedure for transmitting the beam failure recovery request via the one or more SCells using a physical uplink control channel resource group configured for the beam failure recovery request,
   a contention-free random access procedure for transmitting the beam failure recovery request via the one or more SCells,
   a contention-based random access procedure for transmitting the beam failure recovery request via the one or more SCells, or
   a combination thereof.

7. The method of claim 1, wherein the one or more SCells are in a different SCell group than the SCell for which the beam failure is detected.

8. The method of claim 1, wherein the one or more SCells are in a same SCell group as the SCell for which the beam failure is detected.

9. The method of claim 1, wherein the beam failure recovery request is transmitted the first time and the second time based at least in part on a prespecified rule or a rule indicated by a base station.

10. The method of claim 1, wherein the beam failure recovery request is transmitted the first time and the second time based at least in part on a set of channel measurements performed by the UE on at least one of the PCell, the one or more SCells, or a combination thereof.

11. The method of claim 1, wherein the procedure for transmitting the beam failure recovery request via the PCell or via the one or more SCells comprises a procedure for transmitting the beam failure recovery request via an SCell, of the one or more SCells, that is prioritized based at least in part on a set of channel measurements performed by the UE on at least one of the PCell, the one or more SCells, or a combination thereof.

12. The method of claim 1, wherein the procedure for transmitting the beam failure recovery request via the PCell or via the one or more SCells comprises a procedure for transmitting the beam failure recovery request via the PCell that is used based at least in part on a determination that one or more channel measurements for the one or more SCells fail to satisfy a condition.

13. The method of claim 1, wherein the procedure for transmitting the beam failure recovery request via the PCell or via the one or more SCells comprises a procedure for transmitting the beam failure recovery request via a cell, of the PCell or the one or more SCells, configured with a beam failure recovery request resource that occurs earliest in time after detection of the beam failure.

14. The method of claim 1, wherein the procedure is a procedure for transmitting the beam failure recovery request using a physical uplink control channel (PUCCH) resource group configured for the beam failure recovery request on the PCell.

15. The method of claim 1, wherein the procedure is a procedure for transmitting the beam failure recovery request using a physical uplink control channel (PUCCH) resource group configured for the beam failure recovery request on the one or more SCells.

16. A user equipment (UE) for wireless communication, comprising:
a memory; and
one or more processors, coupled to the memory, configured to cause the UE to:
detect beam failure on a secondary cell (SCell), wherein the UE is configured with a primary cell (PCell) and the SCell for carrier aggregation;
transmit a beam failure recovery request a first time using a procedure for transmitting the beam failure recovery request via the PCell or via one or more SCells configured for the UE; and
transmit the beam failure recovery request a second time using a random access channel (RACH) procedure after transmitting the beam failure recovery request the first time using the procedure for transmitting the beam failure recovery request via the PCell or via the one or more SCells, wherein the beam failure recovery request is transmitted using the RACH procedure based at least in part on the procedure for transmitting the beam failure recovery request via the PCell or via the one or more SCells failing a threshold number of times.

17. The UE of claim 16, wherein the one or more processors are further configured to refrain from transmitting the beam failure recovery request using a different procedure based at least in part on a condition associated with the different procedure being satisfied.

18. The UE of claim 17, wherein the different procedure is a procedure for transmitting the beam failure recovery request using a physical uplink control channel (PUCCH) resource group configured for the beam failure recovery request on the one or more SCells, and the condition is that the one or more SCells are not configured with a PUCCH resource group for the beam failure recovery request.

19. The UE of claim 16, wherein the procedure for transmitting the beam failure recovery request via the PCell or via the one or more SCells includes at least one of:
a procedure for transmitting the beam failure recovery request via the one or more SCells using a physical uplink control channel resource group configured for the beam failure recovery request,
a contention-free random access procedure for transmitting the beam failure recovery request via the one or more SCells,
a contention-based random access procedure for transmitting the beam failure recovery request via the one or more SCells, or
a combination thereof.

20. The UE of claim 16, wherein the one or more SCells are in a different SCell group than the SCell for which the beam failure is detected.

21. The UE of claim 16, wherein the one or more SCells are in a same SCell group as the SCell for which the beam failure is detected.

22. The UE of claim 16, wherein the beam failure recovery request is transmitted the first time and the second time based at least in part on a prespecified rule or a rule indicated by a base station.

23. The UE of claim 16, wherein the beam failure recovery request is transmitted the first time and the second time based at least in part on a set of channel measurements performed by the UE on at least one of the PCell, the one or more SCells, or a combination thereof.

24. The UE of claim 16, wherein the procedure for transmitting the beam failure recovery request via the PCell or via the one or more SCells comprises a procedure for transmitting the beam failure recovery request via the PCell that is used based at least in part on a determination that one or more channel measurements for the one or more SCells fail to satisfy a condition.

25. The UE of claim 16, wherein the beam failure recovery request is transmitted the first time and the second time based at least in part on an order in which a set of beam failure recovery request resources, configured for the UE, occur.

26. The UE of claim 16, wherein the beam failure recovery request is transmitted using the RACH procedure further based at least in part on that a timer, associated with transmitting the beam failure recovery request using the procedure for transmitting the beam failure recovery request via the PCell or via the one or more SCells, has expired.

27. The UE of claim 16, wherein the procedure is a procedure for transmitting the beam failure recovery request using a physical uplink control channel (PUCCH) resource group configured for the beam failure recovery request on the PCell.

28. The UE of claim 16, wherein the procedure is a procedure for transmitting the beam failure recovery request using a physical uplink control channel (PUCCH) resource group configured for the beam failure recovery request on the one or more SCells.

29. A non-transitory computer-readable medium storing a set of instructions for wireless communication, the set of instructions comprising:
one or more instructions that, when executed by one or more processors of a user equipment (UE), cause the UE to:
detect beam failure on a secondary cell (SCell), wherein the UE is configured with a primary cell (PCell) and the SCell for carrier aggregation;
transmit a beam failure recovery request a first time using a procedure for transmitting the beam failure recovery request via the PCell or via one or more SCells configured for the UE; and
transmit the beam failure recovery request a second time using a random access channel (RACH) procedure after transmitting the beam failure recovery request the first time using the procedure for transmitting the beam failure recovery request via the PCell or via the one or more SCells, wherein the beam failure recovery request is transmitted using the RACH procedure based at least in part on the procedure for transmitting the beam failure recovery request via the PCell or via the one or more SCells failing a threshold number of times.

30. An apparatus for wireless communication, comprising:
means for detecting beam failure on a secondary cell (SCell), wherein the apparatus is configured with a primary cell (PCell) and the SCell for carrier aggregation;

means for transmitting a beam failure recovery request a first time using a procedure for transmitting the beam failure recovery request via the PCell or via one or more SCells configured for the apparatus; and
means for transmitting the beam failure recovery request a second time using a random access channel (RACH) procedure after transmitting the beam failure recovery request the first time using the procedure for transmitting the beam failure recovery request via the PCell or via the one or more SCells, wherein the beam failure recovery request is transmitted using the RACH procedure based at least in part on the procedure for transmitting the beam failure recovery request via the PCell or via the one or more SCells failing a threshold number of times.

* * * * *